Dec. 18, 1934.  E. K. CLARK  1,985,018
DUAL TEMPERATURE REGULATOR
Filed March 3, 1933  5 Sheets-Sheet 1

INVENTOR
Earl K. Clark.
BY W. R. Coley
ATTORNEY

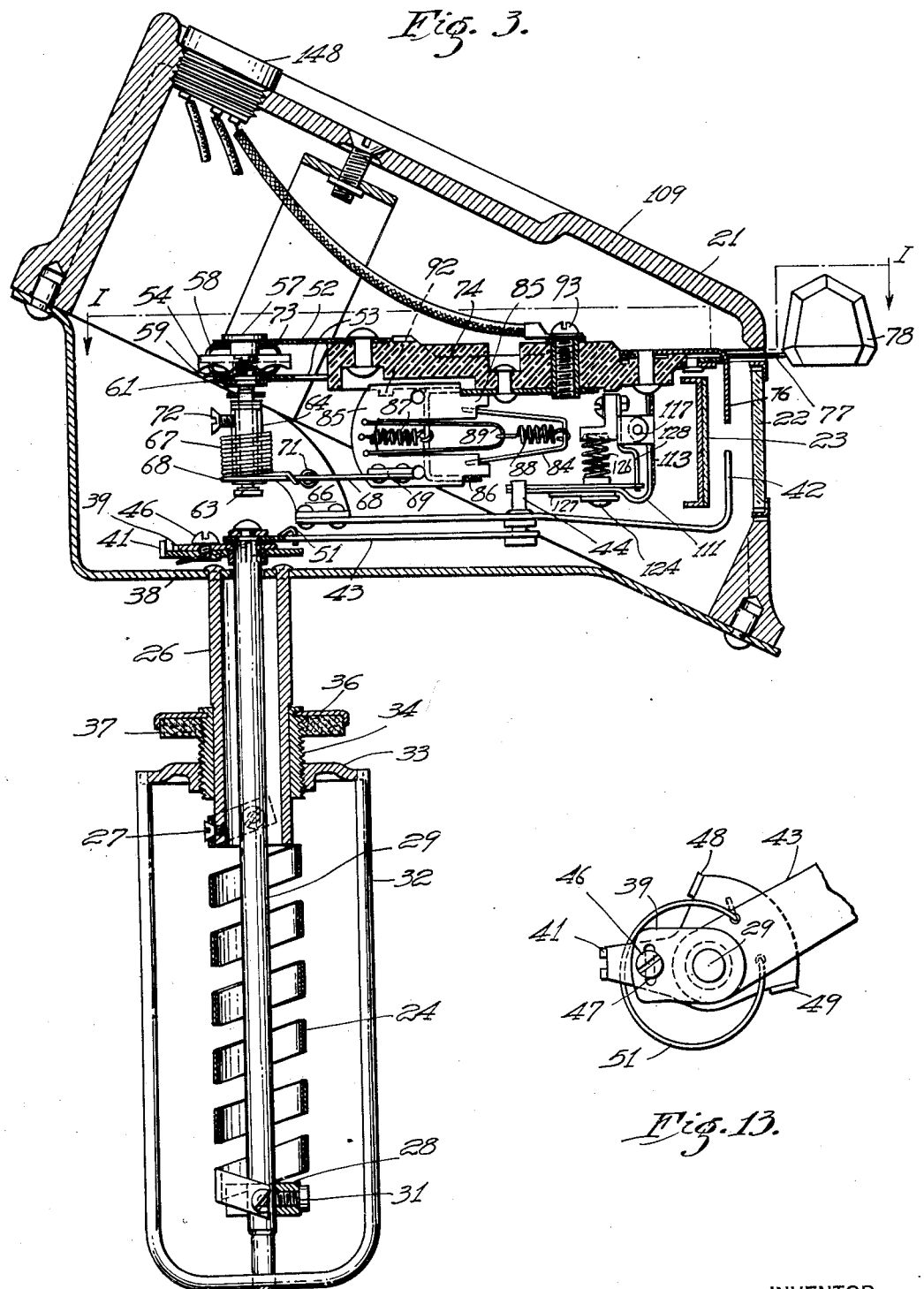

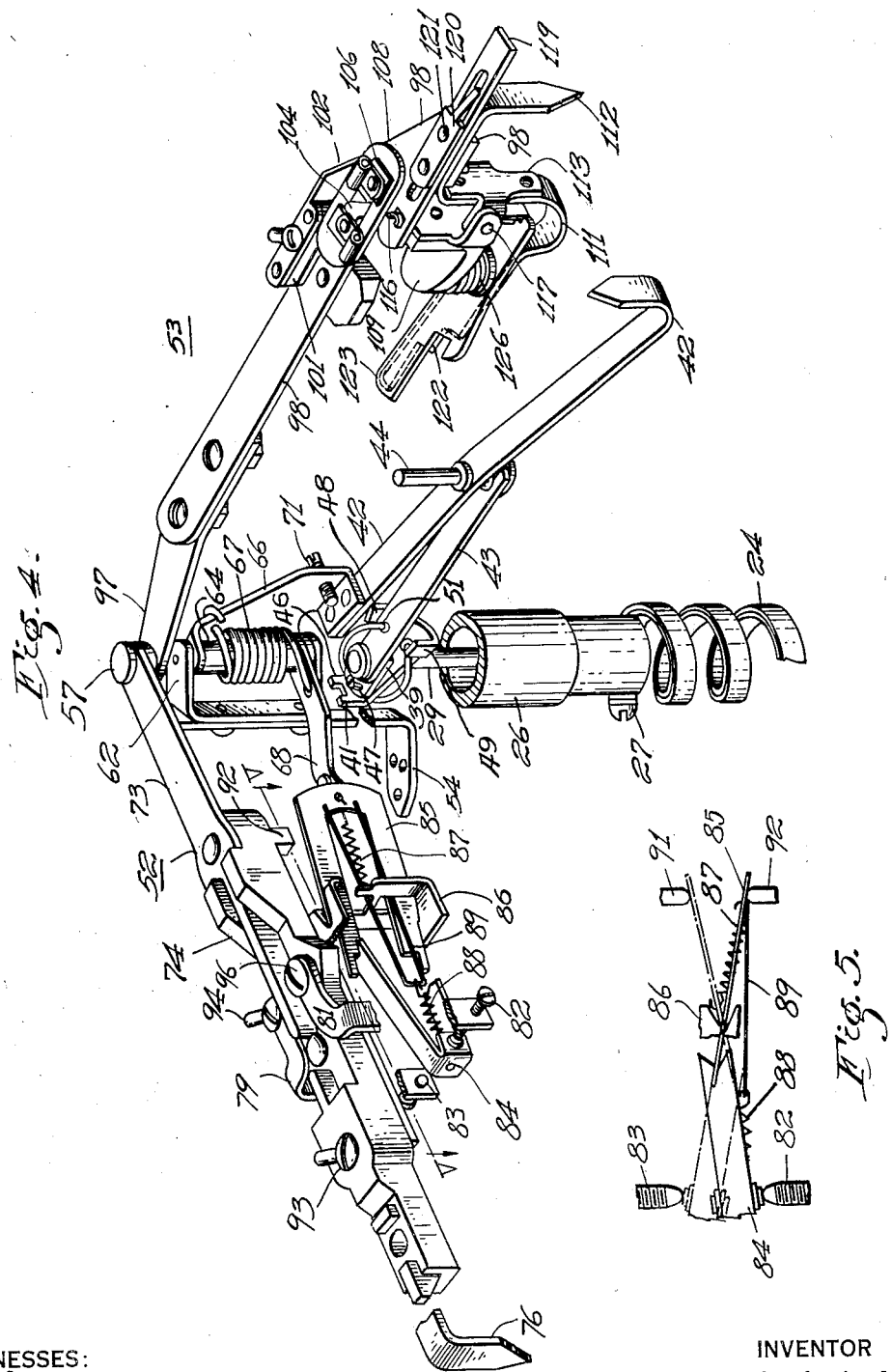

Dec. 18, 1934.  E. K. CLARK  1,985,018
DUAL TEMPERATURE REGULATOR
Filed March 3, 1933   5 Sheets-Sheet 4
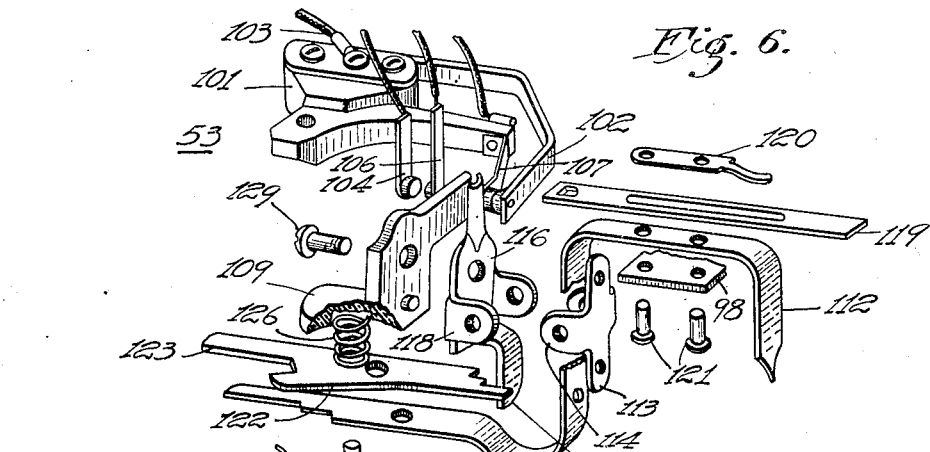
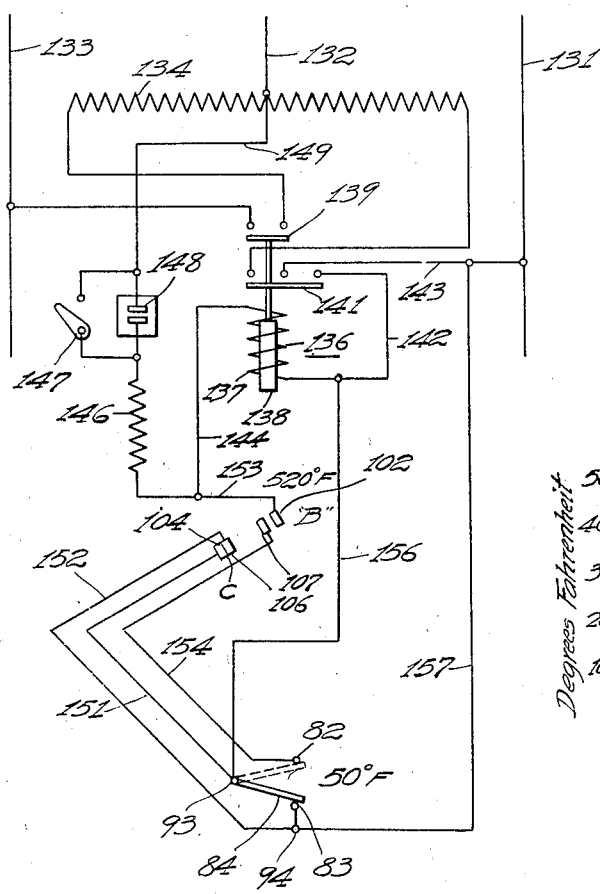
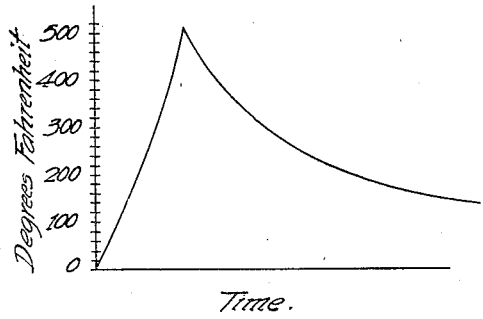
WITNESSES:
INVENTOR
Earl K Clark.
BY
ATTORNEY Dec. 18, 1934.  E. K. CLARK  1,985,018
DUAL TEMPERATURE REGULATOR
Filed March 3, 1933  5 Sheets-Sheet 5

WITNESSES:
E. C. Leiding
N. M. Biehl

INVENTOR
Earl K. Clark.
BY
W. R. Coley
ATTORNEY

Patented Dec. 18, 1934

1,985,018

UNITED STATES PATENT OFFICE 1,985,018

DUAL TEMPERATURE REGULATOR

Earl K. Clark, Mansfield, Ohio, assignor to Westinghouse Electric & Manufacturing Company, East Pittsburgh, Pa., a corporation of Pennsylvania Application March 3, 1933, Serial No. 659,484

21 Claims. (Cl. 200—138)

My invention relates to heating appliances and more particularly to thermostatic devices for controlling the temperature of such appliances.

An object of my invention is to provide a thermostatic switch assembly that will permit of obtaining any one of a plurality of different time-temperature cycles at the will of an operator.

Another object of my invention is to provide a thermostatic switch assembly that may be operatively associated with an electrically heated oven and be mounted on the outside thereof in a position easily accessible to an operator for control and observation.

Another object of my invention is to provide a thermostatic switch assembly for a single thermally actuable arm adapted to cooperate with a maintained temperature and a peak temperature arm each provided with contacts thereon, to control a circuit controller to selectively provide any one of a number of different temperature cycles, as may be desired by an operator.

Still another object of my invention is to provide a relatively simple thermostatic switch assembly operable for the desired purpose.

Other objects of my invention will either be pointed out hereinafter or be evident from the description of a device embodying the invention.

In practicing my invention, I provide a thermally actuable arm subjected to the furnace, oven or chamber temperature, a manually-adjustable maintained temperature arm having a plurality of cooperating fixed and movable contact members thereon, the movable contact members comprising a snap acting switch, and a manually-adjustable peak temperature arm having a plurality of pairs of relatively adjustable contact members thereon. The contact members on the two arms are electrically connected by conductors with each other and with an electric circuit controller which controls the energization of a heating element.

A manually adjustable member on the peak temperature arm effects adjustment of the contact members on the peak temperature arm and a biased latch holds the contact members in such adjusted position until the latch is engaged by the thermally actuable arm.

In the drawings,

Fig. 3 is a vertical sectional view taken on the line III—III of Fig. 1, showing also parts of the peak temperature arm in the same plane.

Figure 9:
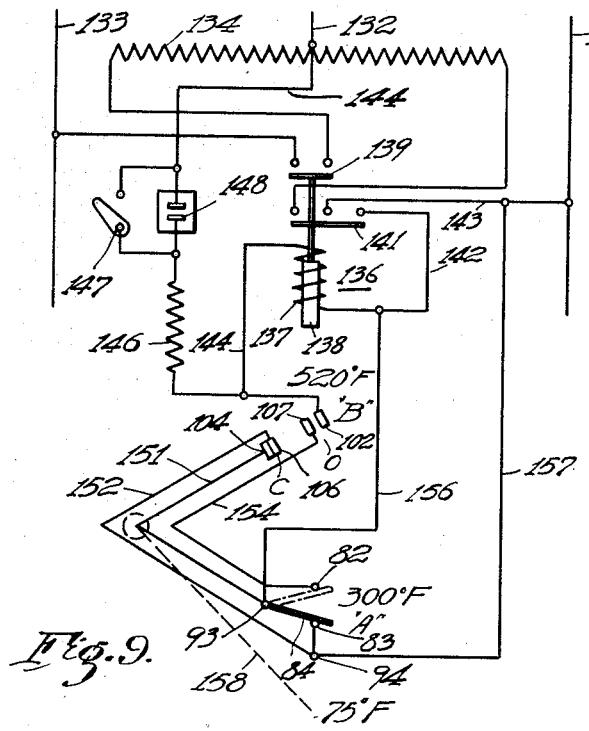
Figure 10:
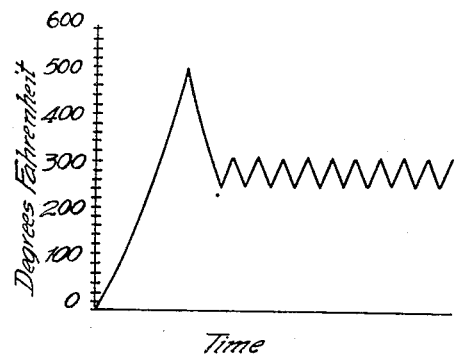
Figure 11:
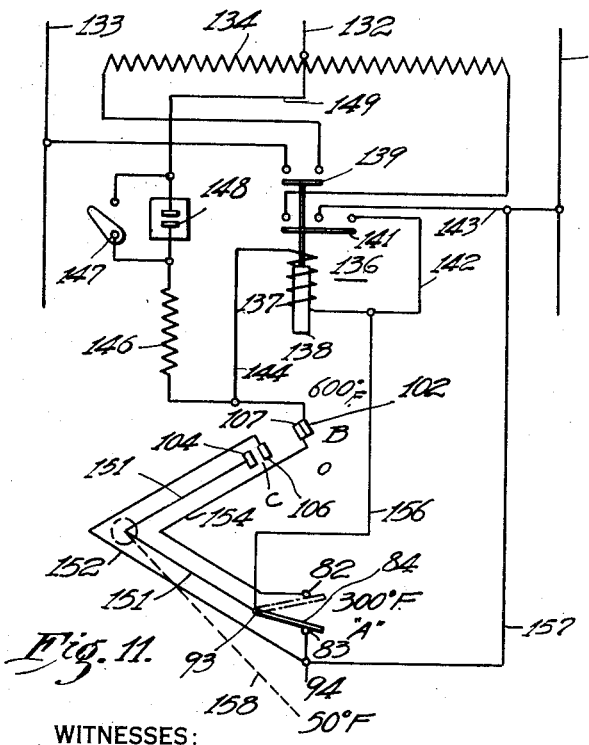
Figure 12:
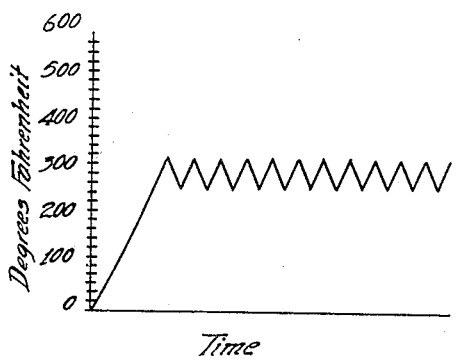

Fig. 4 is a view in perspective and partly exploded of the main operating parts of the device, Fig. 5 is a fragmentary view showing details of a switch constituting part of the device embodying my invention and taken on the line V—V of Fig. 4, Fig. 6 is an exploded view perspective of certain members mounted on the peak temperature arm, Fig. 7 is a diagram of connections of a system embodying my improved thermostat showing contact positions and positions of the two arms to obtain a peak temperature curve, Fig. 8 shows a peak temperature cycle obtained with the system adjusted as shown in Fig. 7, Fig. 9 is a diagram of connections of the same system showing the positions of the contacts and the two arms to obtain a momentary peak temperature and a subsequent maintained average temperature cycle, Fig. 10 shows a temperature cycle obtained with the system adjusted as shown in Fig. 9, Fig. 11 is a diagram of connections permitting an operator to obtain a maintained temperature cycle, Fig. 12 shows a temperature cycle obtained with the system adjusted as shown in Fig. 11, and Fig. 13 is a fragmentary view of an operating connection between a thermally actuable rod and an indicating pointer.

A number of different time and temperature cycles of control for electric ranges, as well as for the control of heat treating ovens, are known but in each case a single predetermined time-temperature cycle has been obtained from a single assembly of parts or from a single system. In contradistinction to this, the device embodying my invention makes it possible, by properly positioning two manually-adjustable contact arms and by the manual control of certain contact members on one of these arms to obtain any one of three different time-temperature cycles.

Figures 1, 2:
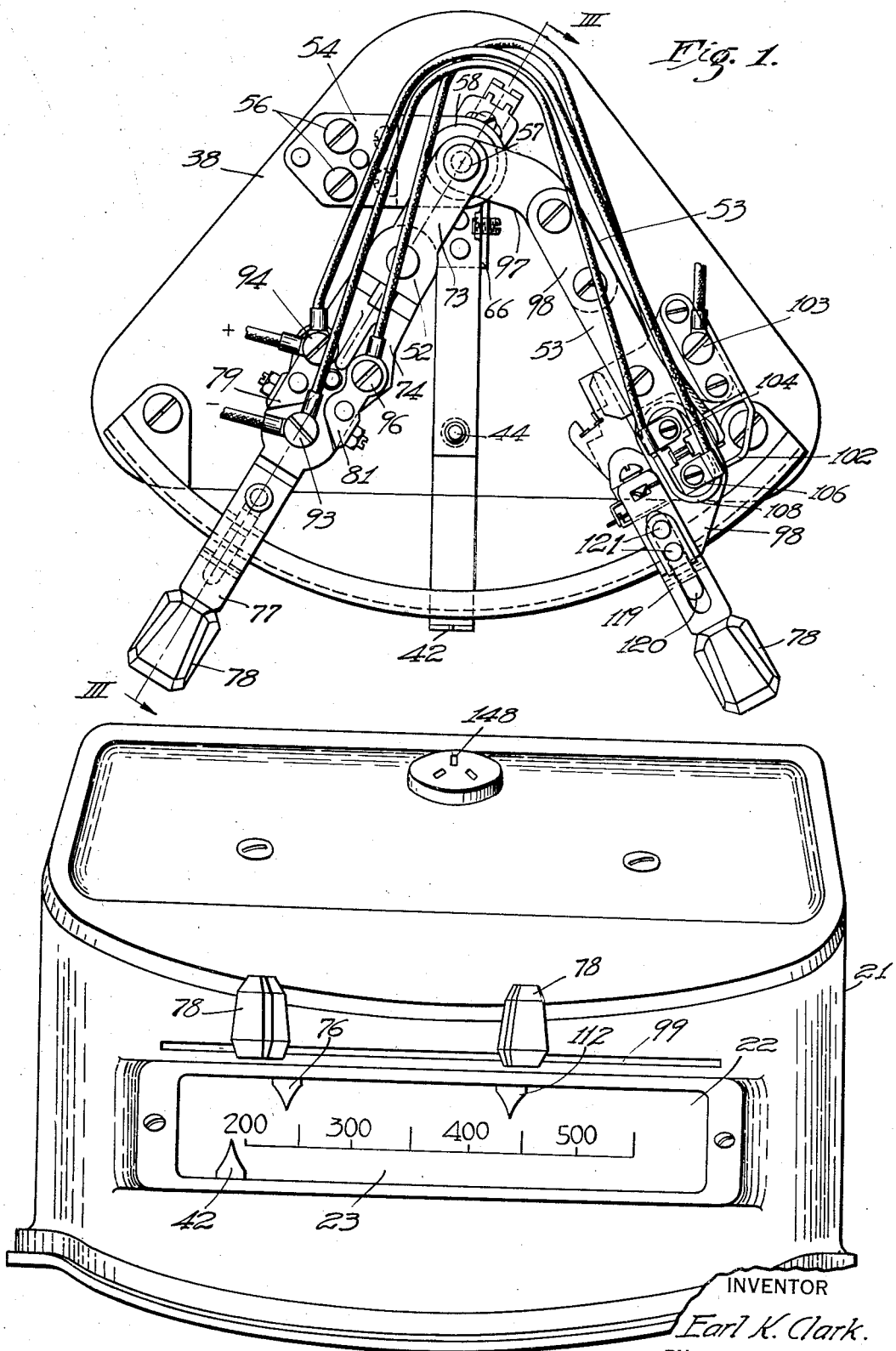
Figure 1 is a top plan view of a thermostatic switch embodying my invention taken on the line I—I of Figure 3.
Fig. 2 is a view in front elevation of an assembled device located in its casing.

Referring more particularly to Fig. 2 of the drawings, I have there shown an assembled device, in front elevation and illustrating more particularly a casing 21, which casing is provided with an opening in the front arcuate portion thereof, in which is located a window 22 for the observation of a scale 23 as will be more particularly referred to hereinafter.

Referring now particularly to Fig. 3 of the drawings, I have there illustrated a helically wound bi-metal strip 24 whose upper end is secured to a wall tube 26 by one or more small machine screws 27, while the lower end of the helical strip 24 is secured to a collar 28. The collar 28 is, in turn, rigidly mounted on and secured to a rod 29, a short point set screw 31 being used for this purpose. A guard 32 is provided for protecting the bi-metal helix and may be in the form of two closed wires, each of U-shape, as may be noted by reference to Fig. 3 of the drawings. The upper ends of the wires constituting the guard 32 are secured to a disk 33 which has screw threaded engagement on a bushing 34 which is provided with external screw threads. The bushing 34 is secured on the wall tube 26 and a second disk 36, of dished shape, is located at the top of the bushing 34 and is filled with a washer 37 which is preferably made of asbestos. The disk 33 and the guard wires secured thereto may be removed from the bushing 34 prior to the mounting of the thermostatic switch on an electric oven and the inner pair of spaced metal walls of an oven clamped between the disk 33 and the asbestos washer 37 to tightly hold the assembly in its proper operative position relatively to the oven or other device with which the thermostatic switch is assembled.

The base of the casing 21 is indicated by numeral 38 and the wall tube 26 may be suitably secured to this base in any manner desired and known in the art.

The upper end of rod 29 has mounted thereon and rigidly secured thereto, an arm 39 which arm is clamped on an adjusting bracket 41 in order to transmit the turning movement of rod 29 to an indicating pointer 42 through an arm 43 which is pivotally mounted on rod 29 but is not secured thereto. The pointer 42 has a pin 44 mounted thereon and extending at right angles thereto and the outer end of arm 43 is provided with a recess which fits over a reduced portion of the pin 44 to move the pointer 42. A locking screw 46 extends through an arm 39 and has screw threaded engagement with the adjusting bracket 41, a slot 47 being provided in arm 39 to permit of adjusting the relative positions of the arm 39 and bracket 41. The adjusting bracket 41 is of substantially L-shape in plan view and that part thereof which is coextensive with arm 43 is substantially wider, or longer in peripheral extent, than the arm 43, lugs 48 and 49 being provided at each edge portion of bracket 41 to act as pawls to carry along arm 43. In order to normally maintain the arm 43 intermediate the lugs 48 and 49, I provide a spring wire 51 surrounding the upper end of rod 29 and having one end thereof secured to arm 43 and the other end thereof to bracket 41. It is obvious, therefore, that the rod 29, arm 39 and bracket 41 will be turned through a small angular distance before this turning movement is communicated to arm 43.

I provide a lower or maintained temperature arm 52 and an upper or peak temperature arm 53 both of which are pivotally mounted on the same axis, which axis is the same as that of rod 29 and that of helix 24. The two arms 52 and 53 are supported on a main bracket 54, which bracket is of substantially Z-shape and has one lateral extension secured to and on top of the base 38 by a plurality of short machine screws 56.

As will be noted by reference to Fig. 3 of the drawings, I provide a short stud 57 having a friction washer 58 located beneath the arm 52 and the upper portion of the main bearing bracket 54 while a shoulder nut 59 is located between bracket 54 and the peak temperature arm 53, a washer 61 being secured on the lower end of stud 57 to hold all of the parts in operative positions relatively to each other. It is obvious however that other equivalent securing means may be used.

Returning now to the connection and mounting for said connection between the upper end of rod 29 and the pointer 42, it may be noted that an auxiliary bracket 62 of substantially channel shape is secured to the intermediate portion of main bracket 54 and that a pin 63 is provided therein surrounded by a bushing 64. The pin 63 has pivotally mounted thereon a supporting bracket 66 for the pointer 42 substantially of the shape shown in Fig. 4 of the drawings. A biasing spring 67 surrounds the bushing 64 and has one of its ends engaging the bracket 66 while the other end engages an auxiliary arm 68 which is rigidly attached to bushing 64. The outer end of auxiliary arm 68 has mounted thereon a tab or lug 69, of electric insulating material, for a purpose to be hereinafter set forth in detail and an adjusting screw 71 changes the angular relationship between auxiliary arm 68 and pointer 42 to make the pointer index properly. The bushing 64 is secured to the pin 63 by a set screw 72.

Referring now to the maintained temperature arm 52, it includes more particularly a short metal bar 73 to the outer or free end of which there is secured a bar 74 of electric-insulating material upon which are mounted certain elements which will now be described in detail. At the outer end of member 74 there is mounted a pointer 76, together with an extension 77 on which is mounted a suitable ornamental knob 78 by means of which the arm may be manually adjusted so that the pointer 76 can cooperate with the scale 23 hereinbefore mentioned.

A pair of spaced contact-support members 79 and 81 are mounted on the electric insulating member 74, the construction being such that a pair of contact members 82 and 83 which may be of screw shape are located below the bottom surface of member 74 in spaced and initially adjustable positions relatively to each other. Cooperating with the contact screws 82 and 83 is a pivotally mounted contact arm 84 of substantially the shape shown in Fig. 4 of the drawings, which contact arm has pivotal engagement with a toggle switch arm 85, both the contact arm 84 and the toggle switch arm 85 being of substantially U-shape. The toggle switch arm 85 is also pivotally mounted on a bracket 86, which bracket is of substantially channel-shape in section and is secured to the under surface of member 74. The contact arm 84 and the toggle switch arm 85 are held in proper operative positions relatively to each other by a plurality of overcenter springs 87 and 88, spring 87 being pivotally connected between the inner end of arm 85 and a part of bracket 86, while spring 88 has one end secured to the intermediate portion of contact arm 84 while its other end is hooked over a loop of wire 89 whose outer ends are also secured in a pivotal manner to the intermediate portion of toggle switch arm 85.

The ordinary toggle switch utilizes a single over-center spring so that the switch has two opposed limiting stable positions. Spring 88 corresponds to this single spring in an ordinary toggle switch. As it is desired that this switch be yieldingly held in one of its two limiting positions, to return thereto when moved therefrom by mechanical means (arm 68), I provide the second spring 87 which not only holds the switch-assembly in the bracket 86 but also so biases the switch assembly that it will return to the position shown in the broken lines in Fig. 5, when permitted to do so, the spring 87 opposing and overcoming the over-center spring tension of spring 88, which would normally tend to keep the switch in its second position, that is, in engagement with contact 82, after having been actuated to that position. Thus when arm 68 is disengaged from member 85, the switch moves to its original position where it engages contact 83.

Reference to Fig. 5 will show the normal and the actuated positions of the switch assembly just described, the normal position of the arms 84 and 85 being indicated by the broken lines, and it may be noted that a stop member 91 depending from member 74 limits the angular or turning movement of the inner part of arm 85 in one direction while a similar stop 92 limits the turning movement of arm 85 in the opposite direction when the same has been moved to the position shown in full lines by member 69 on auxiliary arm 68. The movable part of the switch assembly and more particularly the bracket 86 is electrically connected to a terminal 93 on the outer end portion of member 74. Two other terminals 94 and 96 are also provided for members 79 and 81.

Referring now to the peak temperature arm 53, it may be noted that it comprises a short inner portion 97 whose inner end is pivotally mounted on stud 57, while the outer end thereof has secured thereto an extension 98, the outer end portion of which extends through a slot 99 in the front part of casing 21. Member 98 has secured thereto a block of electric-insulating material 101 which is adapted to support a contact arm 102 and a terminal 103 for the arm 102, as well as a second contact arm 107. The two contact arms 102 and 107 cooperate with each other but are normally out of engagement. A second pair of resilient contact arms 104 and 106 are insulatedly supported on member 98 by a plate or block 108 suitably secured on arm 98.

The position of the contacts on the free end of arms 104 and 106 relatively to contact arms 107 and 102 may be controlled by means of a part of a member 109 of electric-insulating material which is pivotally mounted on a part of arm 98. For this purpose, the outer end of arm 98 extends laterally as may be noted by reference to Figs. 1 and 4 of the drawings, and a composite bracket is secured thereon, which bracket comprises an inwardly extending arm portion 111, an outer pointer portion 112 and an intermediate bracket portion 113, these parts being suitably secured together as by soldering or welding. The portion 113 is provided with radially extending spaced lugs 114 to receive a pivotally mounted arm 116, a pin 117, see Fig. 4 of the drawings, extending through the cooperating lugs 114 and 118 of member 116. The upper end of the pivotally mounted member 116 extends into the path of movement of a handle 119 which may be moved radially of its supporting arm 98, being secured against the upper surface of portion 112 by means of a stop plate 120 which is suitably secured to member 98 as by a plurality of rivets 121, suitable provision being made, of course, to permit the free radial movement of handle 119.

The inner end portion of bracket arm 111 has located on its upper surface, a latch arm 122 having a latch portion 123 at its inner end. A short stud 124 extends through aligned openings in arm 111 and latch arm 122, being suitably secured to arm 111 to hold it in position thereagainst. The upper end of stud 124 is surrounded by a helical spring 126 extending between latch arm 122 and the under surface of a lateral extension of member 109 in order to bias the member 109 and the other parts connected thereto to a predetermined position, as will be hereinafter set forth in detail.

When the handle 119 is pushed radially inwardly, the latch arm 122 is moved in a counter-clockwise direction (as viewed in Fig. 6 of the drawings) by a spring loop 127, whereby a depending portion 128 of member 116 engages a shoulder on the outer end of arm 122 so that member 116 and insulating member 109 secured thereagainst, as by a screw 129, will be held in a second operative position.

Referring now more particularly to Fig. 7 of the drawings, I have there shown a complete diagram of connections of a system with which the particular device embodying my invention may be utilized.

I have shown three suitable supply circuit conductors 131, 132 and 133. I have also shown a resistor 134 which comprises two parts, the midpoint of the resistor being connected to the neutral conductor 132. I have further illustrated an electromagnetic switch 136 which may be considered as including a coil 137 and a movable core 138 actuating an upper contact bridging member 139 and a lower contact bridging member 141. I have shown this device schematically only, as its particular details of construction are not a part of my present invention, and I may use either the construction shown or an equivalent one. The upper contact bridging member 139 closes the circuit between conductor 133 and one end of resistor 134 while the lower contact bridging member 141 closes the circuit between conductor 131 and the other end of resistor 134. The bridging member 141 is shown as being extended in order to provide means for connecting a holding circuit conductor 142 to supply circuit conductor 131.

When the contactor 136 is energized, a circuit will be established through resistor 134 from the supply circuit conductors 131 and 133. At the same time, a holding circuit for the coil 137 will be established from conductor 131 through conductor 143, contact bridging member 141, conductor 142, coil 137, conductor 144, a current limiting resistor 146 and either through a manual switch 147 or through a time-delay circuit represented schematically only by a plurality of contacts 148 and from there through conductor 149 to the neutral conductor 132. I have not shown a time device, as such devices are well known in the art and I wish to explain here that any suitable timing device may be utilized, having connected thereto contact terminals which will cooperate with the spaced terminals 148 shown schematically in Fig. 7 of the drawings and also in front view in Fig. 2 of the drawings, it being understood that switch 147 will be open when it is desired to control the system by a time clock, whereas the switch 147 will be closed when it is not desired to use a time control.

Contact member 104 is connected by a conductor 151 with terminal 93, which terminal, as already set forth, is in electrical connection with the switch supporting bracket 86. Contact member 106 is connected by a conductor 152 with terminal 94, which, as previously described, is in electrical connection with the terminal member 83 on the low side of the maintained temperature arm. Contact member 102 is electrically connected to the junction of coil 137 and resistor 146 by a conductor 153. Contact member 107 is connected by a conductor 154 to the upper contact 82 on the maintained temperature arm. Finally, a conductor 156 connects terminal 93 with conductor 142 which, in effect, provides an electrical connection between the switch arm 84 and one terminal of coil 137. A conductor 157 connects terminal 94 on the maintained temperature arm to supply circuit conductor 131 or to conductor 143 which, as was hereinbefore noted, is connected to supply circuit conductor 131.

Let it be assumed that an operator has placed a quantity of food in an oven chamber, the heating of which is to be effected by the resistor 134 and that it is desired to use a temperature cycle of the general type shown in Fig. 8 of the drawings, which temperature cycle starts with room temperature at some predetermined time, the temperature being raised by the translation of heat in the resistor 134 to a relatively high value, which is sufficient to sear the meat, after which the resistor is deenergized and further cooking is effected by heat stored in the oven.

I have illustrated the positions, corresponding to this particular cycle, of the maintained temperature arm, of the peak temperature arm and of the contact members thereon, schematically in Fig. 7, of the drawings. It may be pointed out here that the maintained temperature arm is preferably set below the ordinary room temperature value, while the peak temperature arm is set at a relatively high value, on the order of 500° to 525° F., a temperature which is sufficient to sear a piece of meat which is to be cooked in the electric range. The handle 119 on the peak temperature arm has been moved to its inner position so that engagement of contact members 102 and 107 has been interrupted and contact members 104 and 106 are in engagement and arm 116 is held in its moved position by latch arm 122.

If the temperature of the oven chamber and of the bi-metal element is that of an ordinary room, say 70° F., it is evident that the pointer 42 will occupy a position beyond the maintained temperature arm, which was set to say 50° F. The switch arm 84 will therefore be in its actuated position and in engagement with contact member 82 as shown by the broken lines in Fig. 7.

Upon energizing the system of circuits shown in Fig. 7, a circuit is established as follows: supply conductor 131, conductors 157 and 152, contacts 104 and 106, conductors 151 and 156, coil 137, conductor 144, resistor 146, switch 147 (or through a time device if set for immediate operation) conductor 149 and to neutral conductor 132. The contactor closes and establishes its own holding circuit through the lower contact bridging member 141 and conductor 142, the rest of the circuit being self evident.

Energization of the resistor 134 will, therefore, continue, with an arcuate movement of indicating pointer 42, until the pin 44 thereon engages the latch 122 and more particularly the portion 123 thereof, whereby the latch arm 122 is caused to be turned in a clockwise direction, as viewed from the top thereof. As a result, the arm 116 is released and the spring 126 operatively engaging the electric-insulating member 109 causes a pivotal movement of member 116 in a clockwise direction, as viewed from the front thereof, so that the radial extension on member 109 causes engagement of contact members 107 and 102, whereby the actuating coil 137 is short circuited, as will be evident from a consideration of the diagram of connections shown in Fig. 7 of the drawings. The temperature of either the interior of the oven chamber or of the food being cooked will, therefore, drop and this reduction in temperature will, of course, be accompanied by a slow return movement of the indicating pointer 42 and of the arm 43 to somewhere near its original position.

As hereinbefore stated, the maintained temperature arm is set at a relatively low value below room temperature, so that even if the oven chamber temperature were to be reduced to substantially room temperature, the contact arm 84 on the maintained temperature arm would not be returned to its original position in which it would engage contact member 83. A certain amount of heat was stored in the heating element support and in the oven structure, which heat will be slowly communicated to the food in the oven chamber and the decrease in temperature will follow well known laws, a greater reduction in temperature being effected in a given time if less heat is stored than would be the case if a larger amount of heat were stored up during the time of energization of resistor 134. This temperature cycle, shown generally in Fig. 8, may be called a coasting-temperature cycle to distinguish it from several other cycles which can be obtained by the use of this thermostatic switch.

Referring now to Fig. 9 of the drawings, I have there illustrated the setting and adjustment of the two arms of the thermostatic switch which will permit of obtaining by electric means a new temperature cycle, shown in Fig. 10. This cycle includes a momentary peak temperature to sear a piece of meat being cooked, and a reduction to a lower temperature, which temperature is then maintained until the meat is properly cooked. It will be noted that the peak temperature arm is adjusted for substantially the same maximum temperature as before described, the handle 119 thereon being in its inner position as was hereinbefore described in connection with Fig. 7 of the drawings. The maintained temperature arm, however, has been moved to approximately 300° F., as indicated on the scale, this being the average temperature at which it is desired to continue the low temperature cooking of the food being prepared in the oven.

It is obvious that starting with the oven at substantially room temperature, the pointer actuated by helix 24 will be in substantially the position indicated by the broken line 158 or at about 75° on the scale on the dial. As soon as the energization of resistor 134 has been continued long enough to raise the temperature of the oven chamber and particularly of the helix 24 to 300° F., the tab or lug 69 on arm 68 will engage the toggle switch arm and cause disengagement of the contact arm 84 from contact terminal 83 and cause it to engage the other contact terminal 82. As has already been set forth, this disengagement will have no effect upon the energization of coil 137 for the reason that the holding circuit of coil 137 is independent of contact arm 84.

Energization of resistor 134 will, therefore, continue until a temperature of 520° F. is reached, at which time the same operation will be effected, as was hereinbefore described in connection with the diagram of Fig. 7, whereby resistor 134 is deenergized and the temperature of the oven chamber and, therefore, of the food therein will be gradually reduced.

However, it is to be noted that because of the release of the arm 122 from latch 128 the positions of the contact members 102—107 and 106—104 is different than shown in Fig. 9. The cooperating contact members 102 and 107 are now in engagement and contact members 106 and 104 are disengaged, which condition is shown in Fig. 11, the contact arm 84 being for the present, in the position shown by the broken lines.

As soon as the indicating pointer actuated by the helix 24 has reached a scale reading of 300° F., the contact arm 84 will be permitted to move back to its original position, that is, into engagement with contact member 83 whereby an energizing circuit through contacting coil 137 is established, this circuit being as follows. From supply circuit conductor 131 and conductor 157 to contact 83, arm 84, conductor 156, coil 137, conductor 144, resistor 146, through either switch 147 or the time controlled contacts 148 and through conductor 149 to the neutral wire 132. The resistor heater 134 will, therefore, be reenergized for a short length of time which will be sufficient to cause an upward movement of the indicating pointer relatively to the scale and until the arm 84 is again moved to the position shown in the broken lines in the diagram of Fig. 9. This short circuits the coil 137, the circuit including conductor 156, arm 84, conductor 154, engaged contacts 107 and 102 and conductor 144, thereby effecting deenergization of the resistor 134, so that the temperature in the oven chamber is again reduced until the backward turning movement of the indicating pointer permits a snap acting movement of contact arm 84 back to the position shown in full lines, whereby reenergization of the resistor 134 is effected. This cycle of operation will be repeated as long as may be permitted either by the manual control of an operator deenergizing the entire system or by having a time controlled means finally opening the circuit as by disengaging the cooperating contact members 148 or by interrupting some other contact members or switch controlled by the clock, it being understood that switch 147 is in its open position.

Referring now to Fig. 11 of the drawings, the setting, as shown, is that for a maintained temperature cooking operation, that is, one in which any desired lower average temperature can be maintained for any length of time. This cycle is shown in Fig. 12 and is particularly applicable to cooking operations such as stewing or boiling. To this effect, the maintained temperature arm is set at the desired value which may be, for purposes of illustration, 300° F. and the peak temperature arm is moved to some higher position which should be at least 50° above that of the maintained temperature arm itself. The handle 119 is not moved radially inwardly as was the case in the other two diagrams of connections so that contact members 104 and 106 are normally out of engagement with each other while contact members 102 and 107 are in engagement with each other.

The initial position of the indicating pointer is, as indicated by the broken line 158 in Fig. 11, approximately 50° F. If now the system is energized, the resistor 134 will cause a rise in temperature in the oven chamber and the indicating pointer will be moved upwardly relatively to the scale of divisions until contact arm 84 is moved out of engagement with contact member 83 and into engagement with the upper contact member 82. Because of the fact that contact members 102 and 107 are in engagement, the engagement of arm 84 with upper contact 82 causes the actuating coil 137 to be short circuited so that the contactor is opened and resistor 134 is deenergized. This, of course, causes a reduction in the temperature in the oven chamber, so that the pointer 42 will move downwardly over the scale and in a short time contact arm 84 is caused to disengage upper contact member 82 and reengage the lower contact member 83 thereby closing the hereinbefore described circuit through coil 137 so that reenergization of the heating element is effected. This cycle of operations will provide a temperature cycle substantially as shown in Fig. 12 and will continue until the entire system is deenergized in a suitable manner by the operator or until a similar deenergization of the system has been effected by a time clock as has already been set forth hereinbefore.

It is, therefore, apparent that the device embodying my invention provides a relatively simple thermostatic switch in which a thermally actuable arm controlled by the oven chamber temperature cooperates with a maintained temperature arm and a peak temperature arm having a plurality of contacts thereon to provide, or to so control a heating element as to provide, selectively any one of a plurality of widely different time-temperature cycles. It may further be noted that the contact terminals on the maintained and on the peak temperature arm are cross connected or interconnected to permit the control of an electric circuit controller to be shifted from either arm to the other as may be necessary in order to obtain the desired time temperature cycle of operation, as set forth hereinbefore.

When the manually adjustable member on the peak temperature arm has been moved inwardly to adjust the positions of two pairs of contacts relatively to each other and when these contacts are maintained in such manually adjusted position, certain contact members on the maintained temperature arm are made ineffective, that is, even though they are caused to engage each other, they will be ineffective to control the circuit of an actuating coil of an electric circuit controller. When the latch on the peak temperature arm is ultimately engaged by the pointer controlled by the thermally actuable member, the positions of the cooperating contact members on the peak temperature arm are changed so that control of the circuit controlling circuit is shifted to a different arm.

Various modifications may be made in the device embodying my invention without departing from the spirit and the scope thereof, and I desire, therefore, that only such limitations shall be placed thereon as are imposed by the prior art or set forth in the appended claims.

I claim as my invention:

1. In a thermostat for controlling an electric circuit controller for a heating element, two plural-contact arms, conductors connecting the contacts on the two arms with each other and with the circuit controller, a single thermally-actuable arm adapted to control the circuit connections of contact members on the two arms and thereby control the energization of the heating element, and manually-operable means on one arm controlling contacts thereon to shift the control of the circuit controller from one to the other of said arms.

2. In a thermostat for controlling an electric circuit controller for a heating element, a peak temperature arm, a maintained temperature arm, a plurality of contact members on each of said arms, conductors connecting contacts on the two arms with each other and with the circuit controller, a single thermally actuable arm adapted to control the circuit connections of contact members on the two arms to thereby control the energization of the circuit controller, and means on the peak temperature arm to control the circuit connections of contact members thereon to make ineffective the contact members on the maintained temperature arm.

3. A system as set forth in claim 2 in which the means on the peak temperature arm comprises a manually adjustable member controlling the circuit connections of certain of the contacts thereon.

4. In a thermostat for controlling an electric circuit controller for a heating element, two plural-contact arms, conductors connecting the contacts on the two arms with each other and with the circuit controller, a single thermally-actuable arm adapted to control the circuit connections of contact members on the two arms and thereby control the energization of the heating element, and means on one arm to control the circuit connections of certain contacts thereon to preclude disengagement of the contacts on the other arm by the thermally-actuable arm from effecting deenergization of the circuit controller.

5. In a thermostat for controlling an electric circuit controller for a heating element, a maintained-temperature arm, a plurality of contacts thereon, a peak-temperature arm having two pairs of cooperating contacts thereon, conductors cross-connecting certain of the contacts on the two arms with each other and with the circuit controller, a thermally-actuable arm adapted to control the circuit connections of the contact members on the two arms to thereby control the circuit controller, manually-operable means on the peak-temperature arm controlling the circuit connections of the pairs of contacts thereon, a latch cooperating with the manually-operable means to hold it in a position to effect engagement of one pair of contact members and disengagement of the other pair, and means on the thermally-actuable arm to effect disengagement of the latch, whereby control of the circuit controller is shifted from the peak temperature arm to the maintained temperature arm.

6. In a thermostat for controlling an electric circuit controller for a heating element, a pair of manually adjustable arms, a thermally-actuable arm adapted to selectively engage said manually-adjustable arms and means including a plurality of contact members on each of the manually-adjustable arms, conductors connecting contact members on different arms with each other and with the circuit controller and a latch for certain of the contacts on one of the manually adjustable arms for shifting control of the circuit controller from one arm to the other when the latch is engaged by the thermally actuable arm.

7. In a thermostat for controlling an electric circuit controller for a heating element, a first manually-adjustable contact arm, a thermally-actuable contact arm adapted to cooperate with said first arm to control the circuit controller, a second manually-adjustable arm, a plurality of contacts thereon, conductors connecting the contacts on the two arms with each other and with the circuit controller, and a manual contact-controlling member on the second arm to so control the circuit connections of the contacts thereon as to selectively prevent engagement of the thermally-actuable arm with the first arm from causing deenergization of the circuit controller and causing such deenergization.

8. In a thermotsat for controlling an electric circuit controller for a heating element, a maintained-temperature arm having a plurality of contacts thereon, conductors connecting said contacts to the circuit controller, a thermally-actuable arm moved in accordance with the temperature of the space ambient to the heating element, a peak-temperature arm having a plurality of relatively-adjustable contacts thereon and conductors connecting certain contacts on the maintained-temperature arm to certain contacts on the peak-temperature arm so that the thermostat will control the circuit controller of the heating element to selectively provide a momentary peak temperature and then a maintained lower temperature or a momentary peak temperature only, in accordance with the spacing between the peak-temperature arm and the maintained-temperature arm.

9. In a thermostat for controlling an electric circuit controller for a heating element, a maintained-temperature arm having a plurality of contacts thereon, a peak-temperature arm having a plurality of relatively adjustable contacts thereon, conductors connecting certain of the contacts on the respective arms with each other and with the circuit controller, and a thermally-actuable lever arm adapted to operatively selectively engage the maintained and the peak temperature arms to effect any one of a plurality of time and temperature cycles in accordance with the adjustment of the contacts on the peak temperature arm and the spacing between the maintained temperature arm and the peak temperature arm, said cycles being as follows, a momentary peak temperature followed by a continuously decreasing temperature, a momentary peak temperature followed by a maintained lower average temperature or a maintained-average temperature.

10. A device as set forth in claim 8 in which the contacts on the maintained temperature arm are selectively engaged by a switch arm, a pivotally mounted support for the switch arm, an abutment for the pivotal support, and an over-center spring for the switch arm and the pivotal support.

11. A device as set forth in claim 8 in which the contacts on the maintained temperature arm are selectively engaged by a switch arm, and in which the thermally-actuable arm is provided with a resiliently-controlled auxiliary arm directly operatively engaging the switch arm to actuate the same and permit movement of the thermally-actuable arm therebeyond.

12. A device as set forth in claim 1 in which the contact-controlling means on one arm is a manually actuable member movable longitudinally of the arm.

13. In a thermostat for controlling an electric circuit controller for a heating element, a peak temperature arm, a maintained temperature arm, a plurality of contact members on each of said arms, conductors connecting contacts on the two arms with each other and with the circuit controller, a single thermally actuable arm adapted to control the circuit connections of contact members on the two arms to thereby control the energization of the circuit controller, a manually adjustable member on the peak temperature arm to control the circuit connections of contact members thereon to make ineffective contact members on the maintained temperature arm, a latch cooperating with the manually-adjustable member to hold certain contacts in adjusted position and a stop lug in the thermostat to release said latch.

14. In a thermostat for controlling a circuit controller for a heating element to obtain a momentary peak temperature followed by a maintained lower average temperature, a maintained temperature arm having cooperating fixed and movable contacts thereon and adapted to be set for the maintained lower temperature, a peak-temperature arm having a plurality of relatively adjustable contacts thereon and adapted to be set for the momentary peak temperature, conductors connecting contacts on the two arms with each other and with the circuit controller, a latch on the peak-temperature arm to maintain certain relative positions of the contacts on that arm, a thermally-actuable arm adapted to first operatively engage the maintained contact arm, then to operatively engage the latch on the peak temperature arm whereby to deenergize the heating element and cause a lowering of the temperature and thereafter recurrently engage the maintained-temperature arm to maintain a desired lower maintained average temperature.

15. In a thermostat for controlling an electric circuit controller for a heating element, two pairs of parallel-connected contacts, electric connections between the circuit controller and certain of said contacts, a thermally-actuable member cooperating selectively with said pairs of contacts to effect control of the circuit controller, one of said pairs of contacts including means for preventing reengagement of said pair of contacts by the action of the thermally-actuable member after having been disengaged thereby.

16. In a thermostat for controlling an electric circuit controller for a heating element, two pairs of parallel-connected contact devices, electric connections between the circuit controller and certain of said contact devices, a thermally-actuable member cooperating selectively with said pairs of contact devices to control the circuit controller, one of said pairs of contact devices including manually-operable means for preventing reengagement thereof by the action of the thermally-actuable member after actuation to their disengaged position thereby.

17. In a thermostat for controlling a circuit controller for a heating element, two parallel-connected contact devices severally controlling the circuit controller, electric connections between the circuit controller and the contact devices, a thermally-actuable means cooperating selectively with the contact devices to control the circuit controller, and means operatively associated with one of said pairs of contact devices to maintain them in ineffective condition after having been actuated thereto by the thermally-actuable means and to shift control of the circuit controller to the other pair of contact devices.

18. In a thermostat for controlling a circuit controlling means for a heating element, two switches for selectively controlling the circuit controlling means, electric connections between the circuit controlling means and the switches, a thermally-actuable means cooperating sequentially with the two switches to control the circuit controller, manually-actuable means operatively associated with one of said switches to render ineffective the cooperation of the thermally-actuable means and the first of said switches, to effect deenergization of the heating element by the circuit controlling means upon cooperation of the thermally-actuable means and the second switch and to simultaneously transfer the control of the circuit controlling means to the first switch in cooperation with the thermally-actuable means.

19. In a thermostat for controlling a circuit controlling means for a heating element, two parallel-connected switches, electric circuits between the switches and the circuit controlling means, a thermally-actuable means cooperating with the switches to effect control of the circuit controlling means, and means operatively associated with one of said switches to cause said switch to lock itself in open position after actuation thereto by the thermally-actuable means and for simultaneously transferring further control of the circuit controlling means to the other switch.

20. A thermostat as set forth in claim 19 in which the two switches are individually manually-movable to vary the operating temperatures thereof.

21. A thermostat as set forth in claim 19 in which the means operatively associated with one of the switches is manually operable.

EARL K. CLARK.